INVENTOR.
REGINALD T. WOOD
BY Walter N. Rodgers
ATTORNEY

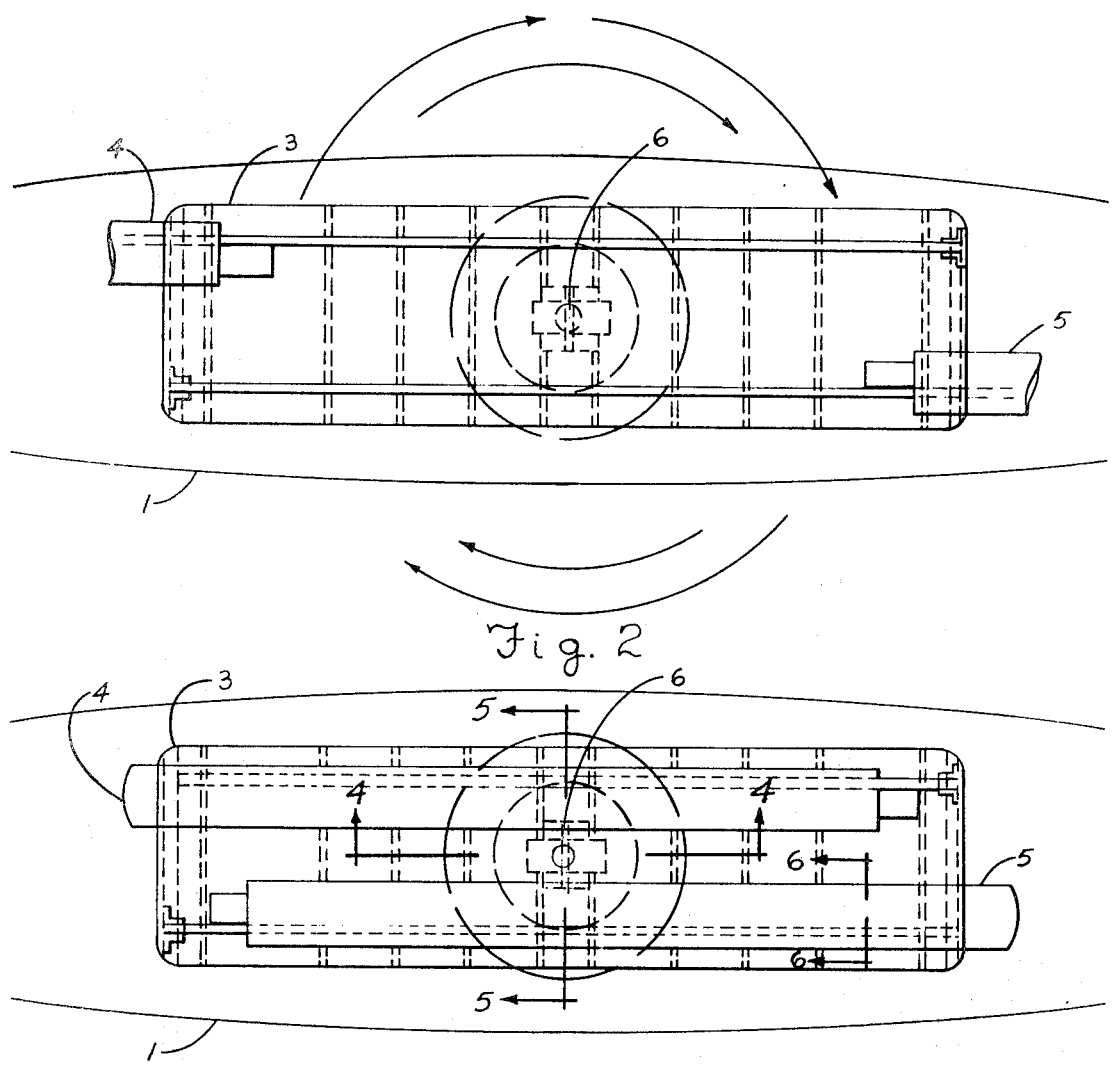

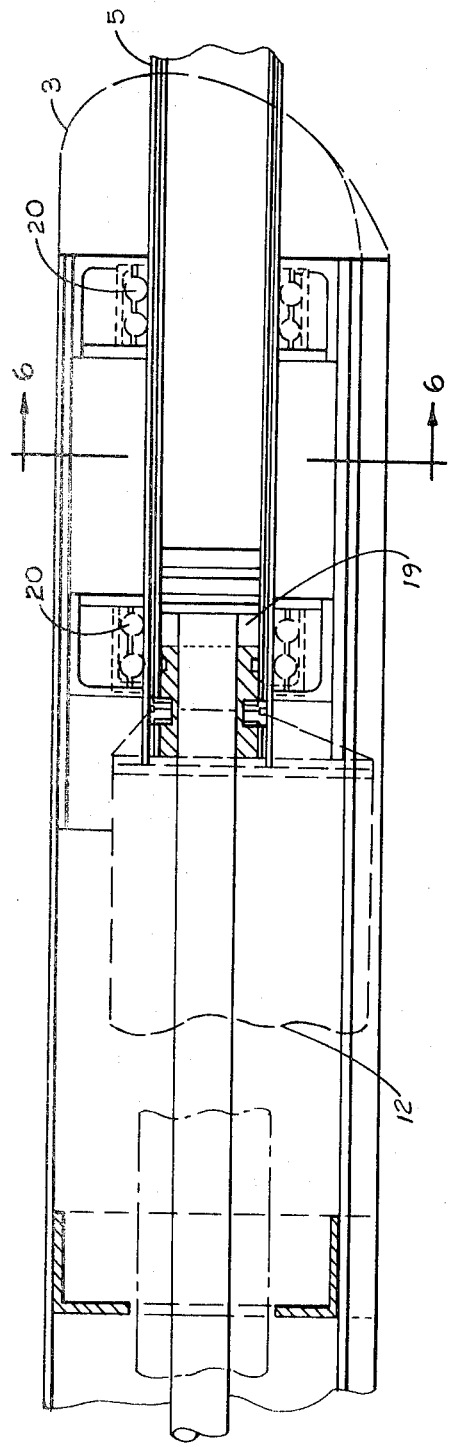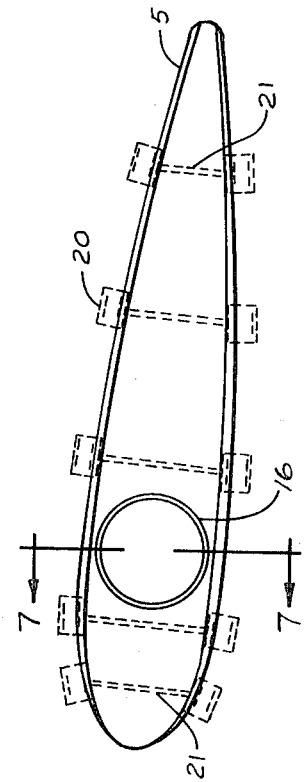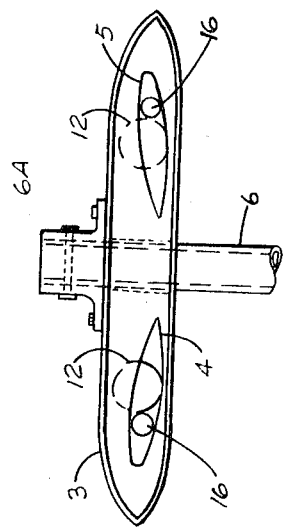

Sept. 20, 1971      R. T. WOOD      3,606,571

STOWED ROTOR

Filed March 7, 1969      4 Sheets-Sheet 4

INVENTOR.
REGINALD T. WOOD
BY Walter M. Rodgers
ATTORNEY

United States Patent Office 3,606,571
Patented Sept. 20, 1971

3,606,571
STOWED ROTOR
Reginald T. Wood, 1150 Atlanta Road,
Marietta, Ga. 30060
Filed Mar. 7, 1969, Ser. No. 805,166
Claims priority, application Great Britain, Mar. 8, 1968,
11,501/68
Int. Cl. B64c 27/22
U.S. Cl. 416—87                                            4 Claims

ABSTRACT OF THE DISCLOSURE

A stowed rotor arrangement is disclosed which is adapted for mounting atop the fuselage of an airplane or the like and comprises a rotatable housing unit mounted on a vertical shaft and provided with telescopically related rotor blade units together with means for extending and retracting the rotor blade units from the housing unit, these units being for the purpose of providing vertical lift for the aircraft so as to facilitate take-off and landing operations.

---

Modern heavier-than-air aircraft are adapted for high-speed operation and hence require high speed take-off and landing operations which make difficult safe emergency landings and which preclude landing and take-off operations on small airports of limited area and on heliports.

One version of the invention comprises a housing unit disposed atop the fuselage of the associated craft and rotatably mounted on a vertically disposed shaft. Extensible telescopically mounted retractable rotor blade units are operably related with the housing unit and suitable operating means for retracting and extending the rotor blade units are provided. Essentially the rotor blade units are mechanically coupled together so that operation of one rotor blade unit is necessarily accompanied by duplicate and identical operation of another rotor blade unit thereby to avoid unbalanced application of lifting and inertia forces. If desired, the housing unit may be mounted on an articulated shaft and preferably the housing unit may be mounted on an articulated shaft using tilt-head principles with a considerable simplification of the whole rotor head.

Figure 1:
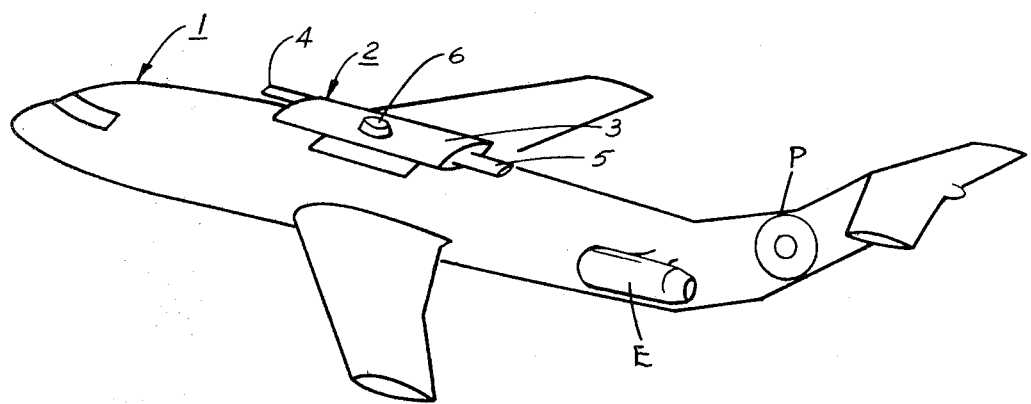
Figure 1A:
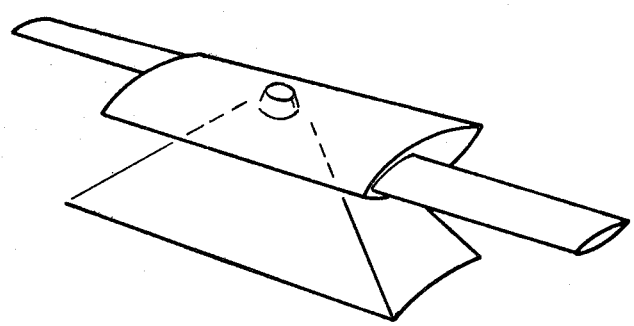
Figure 8:
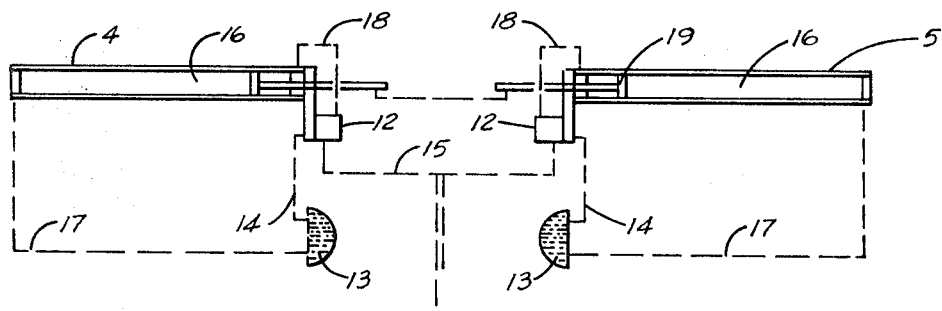
Figure 9:
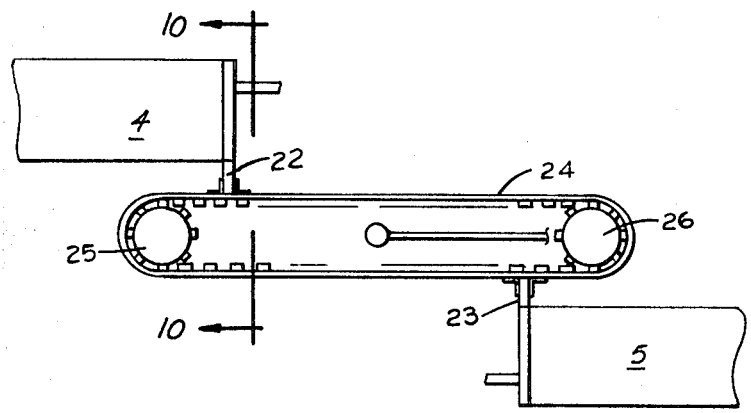
Figure 10:
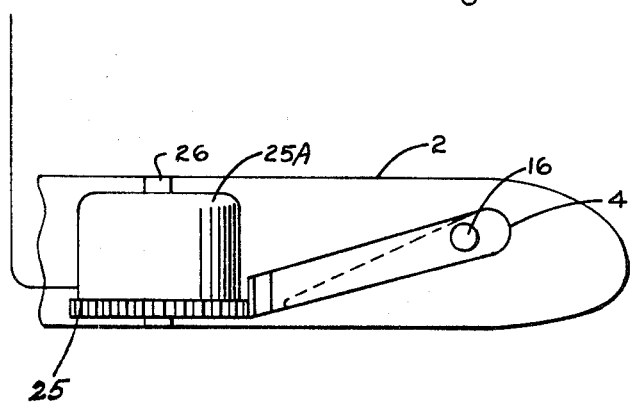

For a better understanding of the invention reference may be had to the following detailed description taken in conjunction with the accompanying drawings in which FIG. 1 is a perspective view of an airplane on which the stowed rotor arrangement of this invention is mounted; FIG. 1a is an enlarged perspective view of a stowed rotor constructed according to the invention; FIG. 2 is a plan view of the stowed rotor arrangement of the invention depicting the rotor blade elements in the extended position, the rotor blade elements being partially shown; FIG. 3 is a view similar to FIG. 2 but in which the rotor blade elements are shown in their retracted positions; FIG. 4 is a cross-sectional view of the stowed rotor arrangement of this invention as it appears in section along the line designated 4—4 in FIG. 3; FIG. 5 is a view in section taken along the line designated 5—5 in FIG. 3; FIG. 6 is a view taken along the line designated 6—6 in FIGS. 3 and 7; FIG. 7 is an enlarged cross sectional view taken along the line designated 7—7 in FIGS. 2 and 6; FIG. 8 is a schematic system view of the principal hydraulic components of the operating means whereby the rotor blade elements are extended and retracted according to the invention; FIG. 9 is a schematic system view depicting mechanical coupling means for interconnecting the rotor blade units whereby each rotor blade unit is movable in exact duplication of the movement of the other rotor blade unit and in which FIG. 10 is a sectional view taken along line 10—10 in FIG. 9.

In FIG. 1 the numeral 1 generally designates an aircraft and the numeral 2 generally designates a stowed rotor assembly constructed according to this invention. As is apparent in FIG. 1, the stowed rotor assembly comprises a housing unit designated by the numeral 3 and a pair of telescopically related rotor blade elements designated by the numerals 4 and 5. Rotor blade elements 4 and 5 are disposed in general alignment with the elongated housing unit 3 and the rotor blade elements 4 and 5 are arranged to extend outwardly from housing unit 2, housing unit 2 and the extensible rotor blade elements 4 and 5 being rotatable about a vertically disposed shaft 6 on which housing unit 2 is mounted. When the rotor blade elements are withdrawn as shown in FIG. 3 they are disposed alongside each other as shown in that figure. In FIG. 1 one of the aircraft engines is shown and is designated at E. This engine could of course constitute a conventional jet engine, if desired although this invention is not limited to aircraft powered with jet engines.

For opposing the reaction of the rotor blade assembly, a propeller P may be provided as in conventional helicopters.

It is preferable for simplicity that shaft 6 be mounted in an articulated fashion. For example and with reference to FIG. 4 shaft 6 is totally supported on ball joint 9. Shaft 6 is driven through universal joint connector 7. Shaft 6 is position-controlled by control rod 8 in a fore and aft and lateral sense. Ball joint 9 is supported on main fuselage structure through discus element 10. Stowed rotor assembly 2 is connected to shaft 6 by a single teetering pin 6A. Teetering motion of the stowed rotor assembly is restrained by flexible mounting 11. Control force applied to shaft 6 by control rod 8 causes the shaft 6, housing 3, and blades 4 and 5 to move in unison about ball joint 9 and also causes articulation of universal joint connector 7.

In order to extend and retract the rotor blade elements 4 and 5 telescopically relative to the housing unit 2, a hydraulic system is provided in accordance with a feature of the invention and comprises a hydraulic pump schematically designated in FIG. 7 by the numeral 12 together with system and cylinder means connected therewith. For the sake of simplicity, certain of the hydraulic conduits have been eliminated from the drawings. As is best shown in FIG. 8, pumps 12 are interconnected with their associated reservoirs 13 via schematically indicated conduits 14 and are interconnected with each other by a common conduit 15 so as to insure equalization of hydraulic pressure throughout the system. Within each of the rotor blade elements 4 and 5 is a cylinder 16 interconnected with reservoirs 13 through schematically shown conduit 17. Pumps 12 are interconnected with their associated cylinders 16 at the inner ends thereof through conduits 18 and fixed pistons 19 are disposed within the cylinders 16.

As is apparent from FIG. 8, the rotor blade elements 4 and 5 may be extended by operating the pumps 12 in such manner as to apply pressure from reservoirs 13 through conduits 17 to the outer ends of the cylinders formed within the rotor blade elements 4 and 5. This pressure disposed outwardly of the fixed piston 19 imparts outward movement to the rotor blade element 4 and 5. In like fashion in order to retract the rotor blade elements 4 and 5, the pump units 12 are reversed and pressure is supplied through conduits 18 to the interior of cylinders 16 and inwardly of the pistons 19. This pressure acting on the inner ends of the cylinders 16 imparts a retracting movement to the cylinders 16 and associated rotor blade elements 4 and 5.

In order to minimize friction between the rotor blade elements such as 4 and 5 and the interior of the housing unit 2, a plurality of rollers such as are designated at 20 are provided.

For the purpose of providing internal structural support for the rotor blade elements, a plurality of rib stiffeners such as are indicated at 21 are provided to afford a stiffening action for the rotor blade elements which, as is particularly apparent in FIG. 6, are of a thin outer skin in which stiffening elements are disposed and are similar to conventional aircraft wing structures and are thus of light weight. Preferably wind drag is kept to a minimum because of the low thickness to width ratio which does not exceed 0.20.

Since a balanced lifting force must be provided under all operating conditions of the stowed rotor arrangement, a coupling system as depicted in FIG. 9 is provided which as schematically shown in FIG. 9 comprises a rigid arm 22 affixed to rotor blade element 4 and a similar arm 23 which is affixed to rotor blade element 5. These transversely disposed arms 22 and 23 are affixed at their inner ends to an endless device such as that indicated by the numeral 24 and which is rotatably mounted at its ends on suitable sprockets such as are indicated at 25 and 26. Thus as is apparent from FIG. 9, inward movement toward the right of rotor blade element 4 necessarily imparts inward movement toward the left of rotor blade element 5 so that irrespective of the direction or magnitude of movement of either element, both rotor blade elements necessarily are required to move in unison. Further, the arrangement of FIG. 9 preferably is adaptable for use as a back-up arrangement for the hydraulic system schematically depicted in FIG. 8 and may serve in the event of failure of the hydraulic system. When so adapted, one of the sprockets such as 25 incorporates an integral reversible electric motor as indicated at 25A which is energized and controlled in any suitable known manner.

Under emergency flying conditions, an aircraft may be landed by gentle vertical downward movement by simply extending the rotor blade elements 4 and 5 after imparting operating movement to the shaft 6. Likewise an airplane may take-off vertically by simply employing the stowed rotor device of this invention and when sufficient altitude is obtained, the conventional power system such as engines E may be employed to impart normal thrust to the craft.

For most applications of the invention rotary motion is imparted to housing 2 and rotor blades 4 and 5 about shaft 6 by simply connecting shaft 6 to suitable motive means not shown. Of course any means for rotating the housing 2 and rotor blades 4 and 5 may be employed. For example, jet action may be used wherein one or more jets could be formed in rotor blades 4 and 5 and arranged to rotate these blades and housing 2 about shaft 6 as is well known.

The embodiments of the invention in which an exclusive property or privilege is claimed are defined as follows:

1. A stowed rotor arrangement for producing vertical lift for an aeronautical vehicle comprising a housing unit mounted on the vehicle and rotatable about an axis which is in general alignment with the direction of lift, a pair of rotor blade elements telescopically mounted in said housing unit and disposed in generally transverse relation to the axis of rotation of said housing unit, driving means including a driven shaft extending through said housing unit and interconnected therewith above said housing unit, rotatable driving means interconnected with said driven shaft through a universal joint and a ball and socket mounting for said driven shaft attached to said housing unit for imparting rotating movement to said housing unit and to said rotor blade elements about the axis of rotation of said housing unit, control means engageable with said driven shaft below said ball and socket joint for imparting control movement to said driven shaft and to said housing unit and rotor blade elements, and operating means for imparting telescopic movement to said elements relative to said housing unit whereby said elements are extended outwardly relative to said housing unit and retracted inwardly into said housing unit, the axis of said rotor blade elements being laterally spaced from the axis of rotation of said housing unit in opposite directions to accommodate side by side disposition of said blade elements in a common generally horizontal plane and with the axis of said blade elements generally parallel to each other.

2. A stowed rotor arrangement according to claim 1 wherein said rotor blade elements are coupled together by a continuous element connected with all of said rotor blade elements and wherein standby motivating means coupled with said continuous element is arranged to impart telescopic movement to said rotor blade elements.

3. A stowed rotor arrangement according to claim 1 wherein each of said rotor blade elements comprises an outer skin having stiffening elements therein and wherein low friction elements are interposed between the exterior of said skin and the adjacent surfaces of said housing unit.

4. A stowed rotor arrangement according to claim 3 wherein the thickness to width ratio of the rotor blade elements does not exceed 0.20.

References Cited

UNITED STATES PATENTS

| | | | |
|---|---|---|---|
| 2,457,429 | 12/1948 | Young | 416—102X |
| 2,120,168 | 6/1938 | Ash | 416—88 |
| 2,173,291 | 9/1939 | Ash | 416—88X |
| 2,464,285 | 3/1949 | Andrews | 416—123X |
| 2,523,216 | 9/1950 | Isacco | 416—88 |
| 2,684,212 | 7/1954 | Vanderlip | 416—87X |
| 2,989,268 | 6/1961 | Andrews | 416—20X |

FOREIGN PATENTS

| | | | |
|---|---|---|---|
| 1,226,719 | 2/1960 | France | 416—88 |
| 1,250,561 | 12/1960 | France | 416—88 |

EVERETTE A. POWELL, Jr., Primary Examiner

U.S. Cl. X.R.

416—143, 148